United States Patent [19]

Totty

[11] Patent Number: 4,840,534

[45] Date of Patent: Jun. 20, 1989

[54] AUTOMOBILE LIFT AND TOW HOIST

[76] Inventor: Jerry Totty, Rte. 2, Box 54, Chaffee, Mo. 63740

[21] Appl. No.: 124,598

[22] Filed: Nov. 24, 1987

[51] Int. Cl.⁴ .............................................. B60P 3/12
[52] U.S. Cl. .................................. 414/563; 280/402
[58] Field of Search ............... 414/563, 546, 550, 500, 414/569, 680, 743; 280/402

[56] References Cited

U.S. PATENT DOCUMENTS

| | | |
|---|---|---|
| 3,434,607 | 3/1969 | Nelson . |
| 3,599,811 | 8/1971 | Watkins . |
| 3,690,482 | 9/1972 | Gaumont ............................ 414/563 |
| 3,924,763 | 12/1975 | Pigeon . |
| 3,931,957 | 1/1976 | Thibodeaux ..................... 414/563 X |
| 3,951,280 | 4/1976 | Peck . |
| 4,384,817 | 5/1983 | Peterson . |
| 4,451,193 | 5/1984 | Cannon, Jr. et al. . |
| 4,473,237 | 9/1984 | Lind . |
| 4,473,334 | 9/1984 | Brown . |
| 4,534,579 | 8/1985 | Shackelford, Sr. . |
| 4,557,496 | 12/1985 | Sill . |
| 4,637,623 | 1/1987 | Bubik ................................. 414/563 |
| 4,640,660 | 2/1987 | Watson ........................... 280/402 X |
| 4,679,978 | 7/1987 | Holmes et al. ..................... 414/563 |
| 4,710,090 | 12/1987 | De Luca et al. ................... 414/550 |

FOREIGN PATENT DOCUMENTS

| | | | |
|---|---|---|---|
| 2821436 | 11/1979 | Fed. Rep. of Germany ...... 414/563 |
| 112838 | 7/1983 | Japan ................................. 414/563 |
| 2061193 | 5/1981 | United Kingdom ................ 414/563 |

Primary Examiner—Frank E. Werner
Attorney, Agent, or Firm—Cushman, Darby & Cushman

[57] ABSTRACT

A truck bed is provided with an upwardly projecting frame to which the front end of the upper leg of a Z-shaped support structure is pivotally mounted for movement about a horizontal transverse axis. The standard is adapted for pivotal movement about a generally horizontal axis, and the lower leg is pivotally mounted to the standard for movement about a horizontal transverse axis. Preferably, respective hydraulic rams are provided for producing movement about the two horizontal axes. At the rear, the lower leg of the support structure is provided with upwardly concave cradles for respective vehicle wheels. Winches, booms, safety chains and the like preferably are provided.

16 Claims, 4 Drawing Sheets 4,840,534

AUTOMOBILE LIFT AND TOW HOIST

BACKGROUND OF THE INVENTION

At present, there are two substantially different types of equipment used for retrieving and transporting automotive vehicles which have been wrecked, run off the road, become disabled on the road or in a parking space whether outdoors or in a garage, or have been illegally parked in a towing zone.

In one of these, a tilt-bed truck is maneuvered to a position directly in front of or to the rear of the vehicle which is to be towed, the tilt bed is tilted, ramps are put in place between the rear edge of the tilted bed and the ground in line with the vehicle wheels, and a winch on the truck is used to pull the vehicle up the ramps and onto the bed. The bed is then returned to a horizontal state and the vehicle is shackled in place for transporting. The tilt bed type of automobile recovery vehicle is well-suited for many situations. However, there are others where its use is impractical.

In the other type, which is perhaps more familiar to most people, a truck bed is provided with a derrick having a rearwardly cantilevered boom for a hook apparatus connected by a line to a power-operated winch. Between the hook apparatus and the reelable line usually there is provided a set of parallel straps which tend to wrap partly about the front (or rear) of the automobile as the respective set of wheels is lifted off the ground by reeling in the line and/or by raising the boom. Due to recent changes in the ways that automobiles are constructed, it has become impractical to lift and tow them using this popular and familar type of automobile recovery vehicle.

Chief among the changes are: the change from a mechanical design comprising a chassis mounted to a relatively rigid frame, to a so-called monocoque type of construction, in which no frame is provided; the change from front and rear ends designed to resist deformation to ones designed to absorb mechanical shock to vehicle occupants by crumpling upon impact; the change from the use of steel to the use of aluminum and plastic for the manufacture of front and rear end portions of automobiles; and the decrease in road clearance by the provision of air dams, front and side spoilers and the like.

All of these changes have created the need for a major re-thinking in the ways and means used for lifting and towing automotive vehicles which are in need of being recovered from one site and taken to another.

SUMMARY OF THE INVENTION

A truck bed is provided with an upwardly projecting frame to which the front end of the upper leg of a Z-shaped suport structure is pivotally mounted for movement about a horizontal transverse axis. The standard is adapted for pivotal movement about a generally horizontal axis, and the lower leg is pivotally mounted to the standard for movement about a horizontal transverse axis. Preferably, respective hydraulic rams are provided for producing movement about the two horizontal axes. At the rear, the lower leg of the support structure is provided with upwardly concave cradles for respective vehicle wheels. Winches, booms, safety chains and the like preferably are provided.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION

Figure 1:
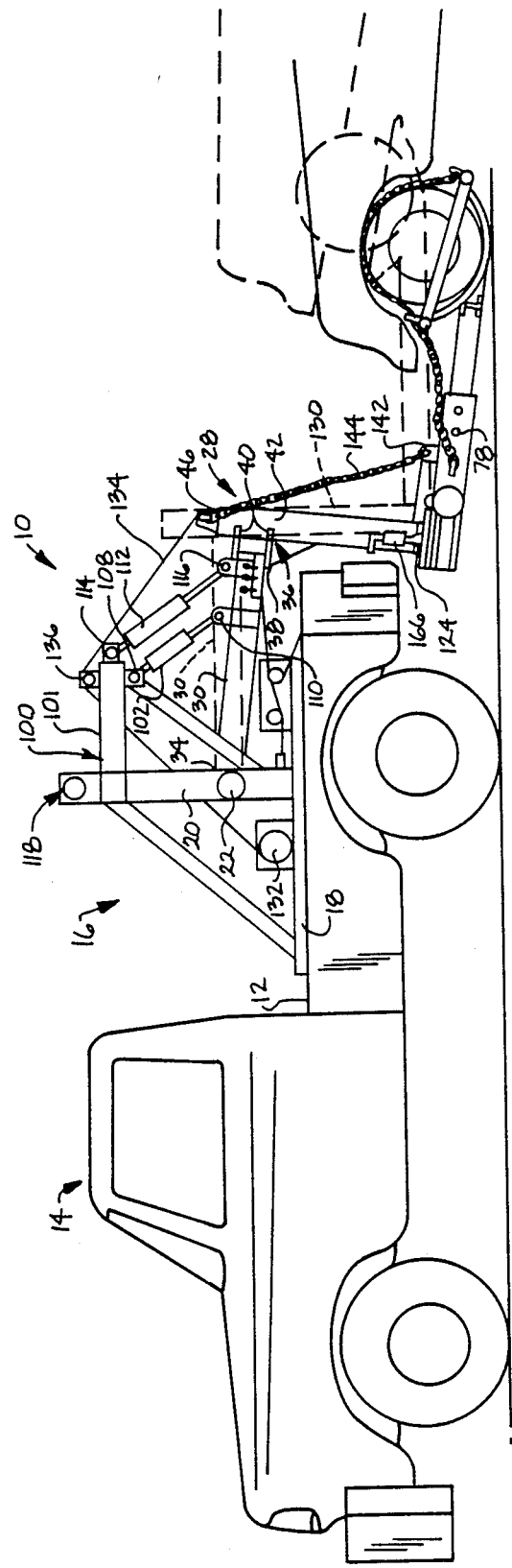
FIG. 1 is a side elevation view of a tow truck provided with a lift and tow hoist embodying principles of the present invention, the lower leg of the Z-shaped support structure being shown disposed at a towing height.
Figure 2:
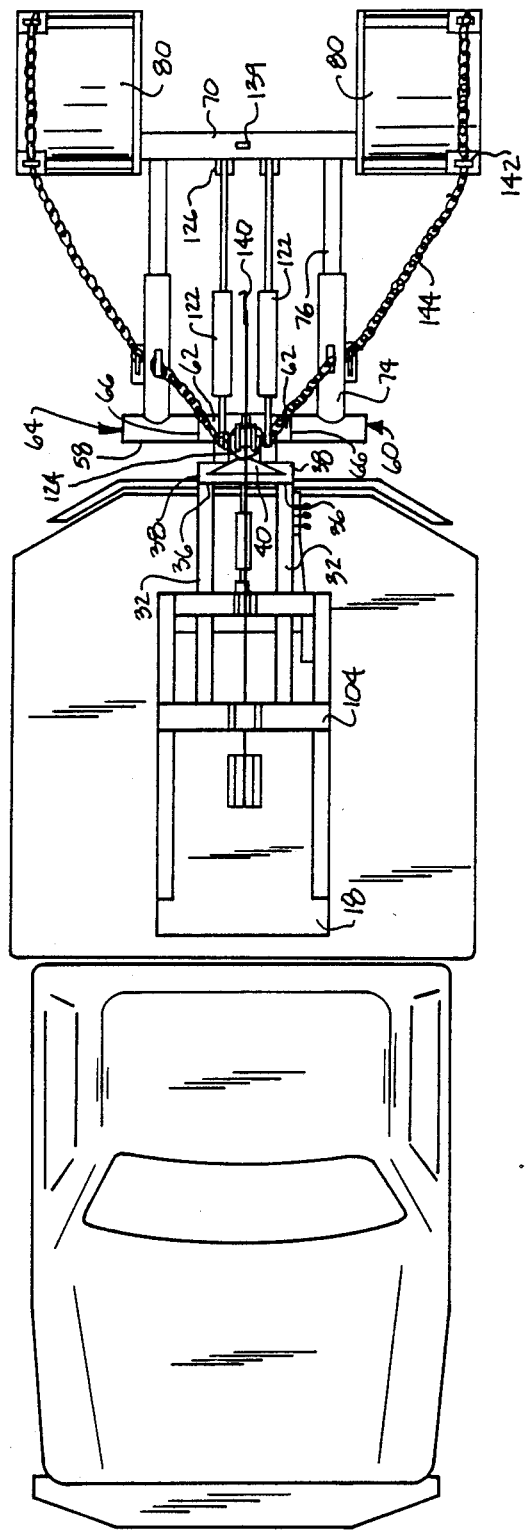
FIG. 2 is a top plan view thereof.
Figure 3:
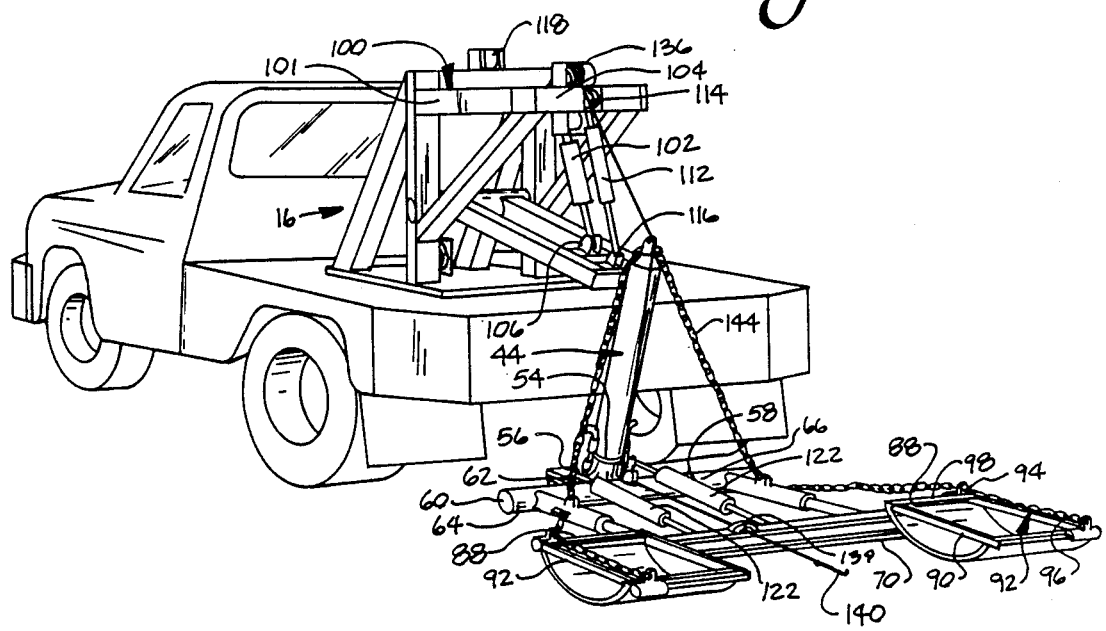
FIG. 3 is a perspective view thereof looking at the rear thereof from somewhat above.
Figure 4:
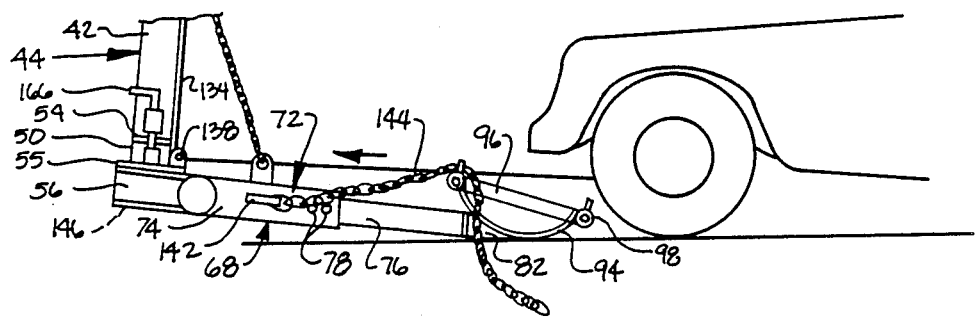
FIG. 4 is a fragmentary side elevational view similar to a portion of FIG. 1, showing the lower leg of the Z-shaped support structure lowered to permit an automobile to be pulled towards the truck so that its wheels are supported on the cradles.
Figure 5:
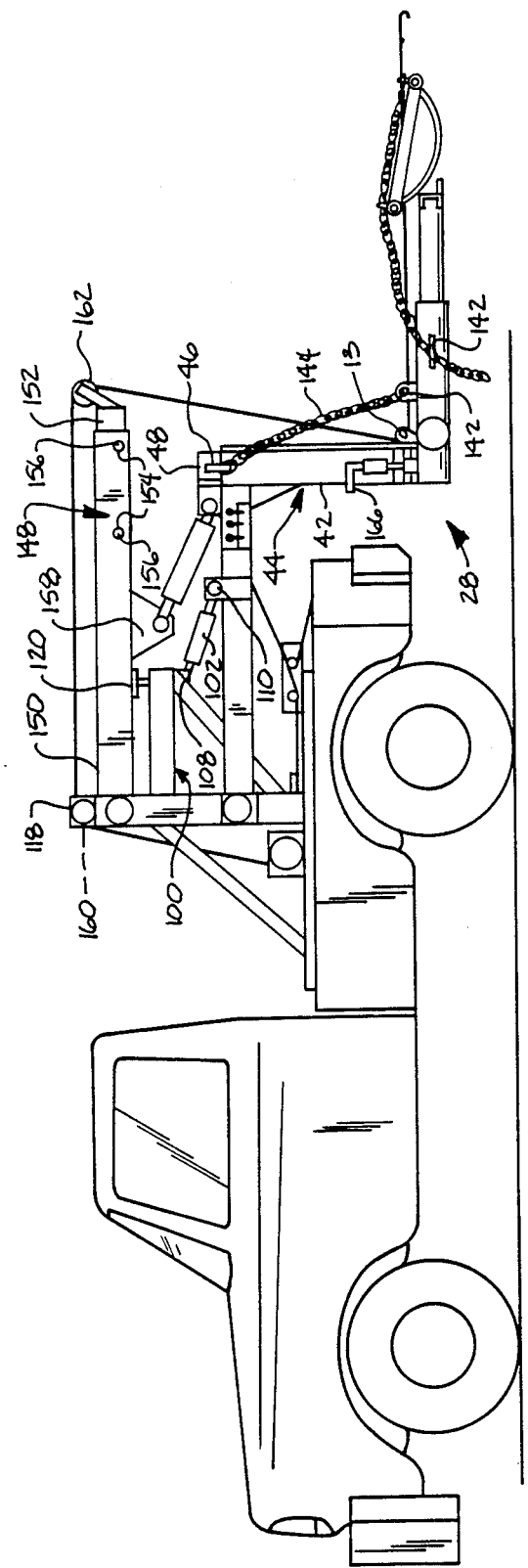
FIG. 5 is a view similar to FIG. 1 of the tow truck having the optional boom of the hoist installed.

The invention may be used on various types of trucks and similar vehicles, and may, in fact, be provided as an accessory or retrofit to an existing wrecker, such as a Holmes 440 series wrecker. When used on an existing wrecker, the derrick of the wrecker may serve as the frame from which the apparatus of the invention is cantilevered, and parts of the existing wrecker, e.g. its winches, boom, some of its hydraulic system, safety chains, cables and the like can be used in association with and indeed as part of the apparatus of the invention. For the purpose of facilitating the description of the invention, much of the conventional structure which could be so used will not be described in detail, on the assumption that those who are skilled in the art are completely familiar with it.

Accordingly, in the simplified showing which is made in the drawings, the automobile lift and tow hoist 10 of the invention is securely mounted on the bed 12 of a truck 14. The hoist 10 is shown including a rigid frame 16 having a base 18 which is secured on the truck bed, and upstanding framework members 20 which provide a lubricated hinge 22 made of coaxial pipe arranged so that the outer pipe 24 is disposed so as to extend horizontally, transversally of the truck, centered on the longitudinal medial plane of the truck, ahead of the truck's rear wheels, and usually at a site located about half-way along the length of the truck, i.e. considerably to the front of the rear edge of the truck bed. The hinge 22 also is located preferably about 1-2 feet above the level of the truck bed, for reasons which will become clearer from the further description provided herein below.

The rotatable outer pipe 24 of the hinge 22 is one of the main members by which a Z-shaped support structure 28 is mounted to the frame 16.

The Z-shaped support structure 28 includes an upper leg 30 preferably provided as a pair of laterally-spaced, parallel, usually approximately horizontal I-beams 32 made of steel, having their forward ends 34 (all directions being specified using those of the truck for reference) welded to the outer pipe 24 of the hinge 22. The rear ends 36 of the I-beams 32 are welded to a transversally-extending box beam 38 which unites them. The box beam 38 is welded using transition plates 40 to the outer, non-rotary pipe 42 of a pipe joint 44 which serves as the approximately vertical standard of the Z-shaped support structure 28.

The standard 44 further includes an inner, rotary pipe 46 having upper and lower end portions 48, 50 which protrude and are provided with thrust bearing collars 52 which engage opposite ends of the outer pipe 42 so as to carry load from the rotary to non-rotary part of the joint 44 while preventing axial movement of the inner, rotary pipe 46 relative to the outer, stationary pipe 42.

To the lower protrusion 50 is secured a plate 55 which is in turn secured to the top flanges of two laterally-spaced I-beams 56 near the front ends of those I-beams. The I-beams 56 are secured at their rear ends to the outer pipe 58 of a third pipe hinge 60 (counting the vertical one 44, but second, if counting only the similarly-oriented, first-described transverse, horizontal axis pipe hinge 22).

The pipe hinge 60 further includes an inner pipe 62 which has portions 64 extending out of the laterally opposite ends of the outer pipe 58. Stop collars 66, secured on the protruding portions 64 of the inner pipe to bear against opposite ends of the outer pipe 58 prevent relative axial movement of the two pipe members 62, 58 of the pipe hinge 60.

The forward ends of two laterally spaced, longitudinally extending beams 68 are secured to the protruding portions 64 of the inner pipe 62 and their rear ends are secured to a horizontally, transversally extending beam 70 so that the structure 62, 68, 70 provides the lower, generally horizontal leg 72 of the Z-shaped support structure.

The longitudinally extending beams 68 may each be constituted by respective sets of two telescopically slidably-related pipes 74, 76 having means such as hydraulically-operated cylinders for adjusting platform length. Alternatively, the adjustment may be made manually and alignable holes provided into which bolts, cotter pins or the like 78 may be installed for adjustably coordinately varying the effective lengths of the beams 68 so that the hoist 10 may accommodate automobiles having different length dimensions measuring from bottom dead center of the tires of the end (e.g. the front end) of the automobile, to its most longitudinally prominent feature at the same end (e.g. the bumper guards on the front bumper).

The beam 70 may, for instance, be a box beam or an eye beam. Two upwardly generally part-cylindrically concave, laterally spaced cradles 80 are secured to the beam 70, e.g. by transition plates 82 so as to extend rearwardly from the beam 70. The upper surfaces 84 of the cradles 80 have a curvature generally complementary to the tread portions of tires of automobiles likely to be recovered using the apparatus 10. The widths and spacing of the cradles 80 is sufficient to permit a vehicle which is likely to be recovered to have the tread portions of the tires at one end of that vehicle to nestle securely in the cradles 80 when the vehicle is raised for being towed. The arcuate extent of the cradles 80 is such that when the lower leg of the Z-shaped support structure is tilted down (as will be described in further detail hereinbelow) the rear edges 84 of the cradles 80 are substantially or nearly flush with the pavement or ground, so that the vehicle which is to be recovered can easily be pushed, pulled or driven so that the respective set of wheels is supported on the cradles on the pavement or ground. Raising the lower leg 72 of the Z-shaped support structure is accomplished by a pivot movement that, in effect, raises the rear edges 84, so that both the front and rear edges 86, 84 of the cradles are at least a couple of inches above bottom dead centers of the tires at the lifted end of the automobile. Stops 88 and skid guards 90, 92 are mounted on the cradles 80 and beam 70 and/or otherwise on the lower leg 72 of the Z-shaped support structure 28 for preventing the wheels at the raised end of the vehicle being towed from slipping or sliding longitudinally and laterally off of the cradles 80. The more laterally located skid guards 92 are preferably welded to beam 70 and to cradles 80, e.g. each formed by two short lengths of horizontally, transversally extending pipes 94 secured to a bar 96, with the pipes 94 being arranged to slide onto fore and aft rods 98 secured to the skid guards 90, 92 for that purpose.

The upstanding frame members 20 of the frame 16 of the hoist 10 are shown having secured thereto at a level substantially above that of the hinge 22 a horizontal, squared U-shaped bracket 100 having laterally opposite longitudinally rearwardly extending beams 101 interconnected at their rear ends by a cross-beam 104.

The hoist 10 is designed to provide for powered articulation of the upper, front and lower, rear transverse horizontal axis pivot joints 22 and 60.

The articulation capability of the hinge 22 is preferably provided by a double-acting hydraulic ram 112 (i.e. a pressurized fluid-operated piston-cylinder arrangement provided with a supply of pressurized fluid which can be directed to opposite ends of the piston member of the arrangement for longitudinally extending and retracting the arrangement). The ram 112 has its opposite ends mounted medially to the cross-beam 104 and to a cross-beam 106 provided on the upper leg 30 of the Z-shaped support structure 28 near the standard 44. (The length and mounting of the ram 102 is preferably such that it is forwardly inclined at an angle of about 30° to horizontal when the upper leg 30 is horizontal. Mounting of the opposite ends of the ram 102 to the respective cross-beams is by means of clevises or lugs and pins 108, 110, which have respective horizontal transverse pivot axes.

In the instance depicted, the action of the ram 112 is supplemented or complemented by a slide lock or load lock 102 of conventional construction which is shown also being medially located parallel to and spaced adjacently to the front of the ram 112, and pivotally connected at opposite ends by clevises or lug and pin arrangements 114, 116 to the same structures as the clevises or lug and pin arrangements 108, 110. (In a variation which is described hereinbelow, the upper end of the ram 112 is mounted to a boom. To that end, a horizontal axis pivot joint for mounting a boom is shown provided at 118 on the upper ends of the upstanding frame elements 20 of the frame 16, and a rest or stop on which the boom may rest in a generally horizontal, longitudinally rearwardly projecting attitude is shown provided at 120 medially on the upper surface of cross-beam 104.

The articulation capability of the hinge 60 is preferably provided by a pair of laterally-spaced double-acting hydraulic rams 122 having opposite ends connected by transverse, horizontal axis clevis joints 124 and 126 respectively to laterally spaced upstanding projections 128 on the plate 54 on opposite sides of the pipe 42, and to the cradle-mounting cross-beam 70 of the lower leg of the Z-shaped support structure 28.

Extending the rams 102 and 112 tilts the upper leg 30 relatively rearwardly downwards, and retracting the rams 102 and 112 tilts the upper leg 30 relatively upwards. Likewise, extending the rams 122 tilts the lower leg 72 relatively rearwardly downwards, and retracting the rams 122 tilts the lower leg 72 relatively upwards. The safety chain 144 determines the elevation.

Accordingly, lowering the cradles 80 and tilting them rearwardly so that their rear edges are at pavement or ground level may be accomplished by any combination of extending the slide lock and ram 102, 112 (coordinately) and extending the rams 122 (coordinately), and elevating the end of the vehicle having its wheels resting in the cradles 80 may be accomplished by any combination of retracting the slide lock and ram 102 and 112 (coordinately), and retracting the rams 122 (coordinately). Generally, however, the raising and lowering of the automobile end is accomplished primarily or entirely by retracting and extending the slide lock and ram 102, 112 (coordinately), and extension and retraction of the rams 122 (coordinately) are used principally for moving the lower leg 72 of the Z-shaped support structure between the position of use which is depicted (in which it is generally horizontal or tilts downwards to the rear), and a stowed condition, wherein the lower leg 72 has pivoted to a nearly vertical condition so that it has the disposition which is suggested at 130 in phantom lines, e.g. so that the truck 14 can travel briskly along the highway on its way to recover an automobile, i.e. when it is not towing anything.

Various other structural features which are depicted are useful for safety reasons and for adding to the versatility of the apparatus.

For instance, even in the boomless version, a winching capability can be provided for pulling the automobile towards the truck while the cradles 80 are lowered to the pavement or ground, so that a respective set of the automobile's wheels become supported on the cradles 80. In the instance depicted, this winching capability is shown provided by a power-rotatable drum 132 mounted on the truck bed 12, having a winching cable 134 with one end secured thereon to wind and unwind therefrom as the drum is reversibly rotated. The cable 134 is shown extending from the drum 132 rearwards and upwards over a pulley 136 medially mounted on the cross-arm of the bracket 100, down under pulley 138 on the lower leg 72 near the standard 44 terminating in a hook 140.

The securements of one element to another, when fixed, preferably are weldments and/or nut and bolt connections. There need be nothing remarkable in the hydraulic system for operating the rams 102, 112, 122. None of the structure is made of unusual materials, steel plate, pipe, bar, chain and channel being predominant. Various eyes 142 which are illustrated facilitate the securement of safety chains 144 (some of which are illustrated) for providing a mechanical fail-safe back-up in the event of loss of hydraulic pressure, and/or permit the load to be borne mechanically during towing, and also permit the automobile being towed to be chained to the hoist 10. Outriggers 146 may be mounted to the opposite ends of the front cross-beam of the lower leg for supporting the rear part of the truck/winch combination on the pavement/ground as the winch is being used to recover toward the truck a vehicle which, e.g., has run off into a ditch.

In the elaboration which includes a boom, a boom 148 with telescopically-related sections 150, 152 has its forward end pivotally connected to the top of the frame members 20 (as indicated above), so as to extend rearwardly. Sets of alignable holes 154, adapted to receive a securement device 156 are provided for selectively lengthening/shortening the boom, if hydraulic cylinder operation is not used to provide this function. The upper clevis of the hydraulic ram 112 is disassembled, and an alternate ear 158 thereof, provided on the underside of the boom, so the ram 112 may be used for raising and lowering the boom 148. The cable 134 is rerouted so as to pass from the drum 132 over the pulley 160 at the front of the boom 148, rearwardly along the upper surface of the boom to a pulley 162 protruding from the rear end of the boom 148. The hook may simply depend from the cable as entrained about the pulley 162, i.e. for using the boom as a crane, or the cable may be entrained around the pulley 138 for using the hook 140 in the same manner as described above in relation to the boomless version. The outriggers described above are particularly useful when using the boom as a crane. The crane, in some instances, may be used for towing another vehicle using the hook suspended on the cable from the pulley 162. However, it is recommended that the hook be attached to the raised vehicle for added safety when towing.

Some numerical values are now provided for further illustrating details of the preferred embodiment. The chain-connection lugs are preferably made of one-half inch steel plate welded using 70,000 pound tensile strength weldments. The cradles provide one-half inch of steel under the tires of the automobile being towed. The overall width of the cradle structure (from outboard edge of one cradle to outboard edge of the other) is 6 feet 8 inches. The fully condensed length of the telescopic longitudinal members of the lower leg 72 is 2 feet 8 inches. The overall height of the standard 44 is 3 feet 3 inches. The outer pipe of the lower transverse pipe hinge is 1 foot 6 inches long. It is a 4½ inch O.D. steel pipe. The lower leg 72 of the hoist 10 (including the cradles 80) is 4½ inch in height when lowered to the pavement or ground, so it will easily fit under even very low-clearance vehicles.

The position of a towed vehicle is suggested by the phantom lines 164.

The standard 44 is preferably of such relative length that when the front wheels (or rear wheels) of the automobile which are supported on the cradles are raised sufficiently off the pavement or ground to permit safe towing of the vehicle, the standard 44 in the usual situation will be substantially vertical and disposed at a right angle not only to the upper leg of the Z-shaped support structure, but also to the lower leg thereof. For safety in towing, the elevation of the upper leg of the Z-shaped support structure should be maintained not principally by the respective hydraulic rams, but by safety chain means 144 extending therefrom up to elevated sites on the framework 16, and by the slide lock 102.

The rotatability of the inner pipe of the standard 44 relative to the outer pipe permits the towed vehicle to swing, e.g. 25° to the left and to the right, relative to the longitudinal axis of the towing vehicle, e.g. to facilitate maneuvering and cornering. However, where such a degree of mobility is not desired, relative rotation can be restricted or prevented, e.g. by using pin-in-slot connector means provided between the rotatable and nonrotatable members of the hinge 44, e.g. at 166.

It should now be apparent that the automobile lift and tow hoist as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A hoist for lifting and towing an automobile using a tow truck or similar towing vehicle, said hoist comprising:

a frame work including a base adapted to be mounted on a vehicle bed and laterally spaced upstanding frame members mounted to the base and projecting upwardly therefrom;

a Z-shaped support structure including: a generally vertical standard; a generally horizontal upper leg having a front end hinged to said frame members by an upper, front transverse, horizontal-axis hinge member, and a rear end secured to said generally vertical standard, which is adapted to be disposed adjacent but to the rear of the vehicle bed on which the framework is mounted in use, at an upper site on said standard; and a lower leg having a front end mounted to said standard at a lower site which is arranged to be located, in use, adjacent but above a ground surface on which the towing vehicle may run, said upper site being disposed to be located, in use, above said vehicle bed, and said lower site being disposed to be located, in use, below said vehicle bed; said lower leg being joined at said front end thereof to said standard at said lower site by a lower, rear transverse, horizontal-axis hinge member; and said lower leg being provided at a rear end thereof with left and right, upwardly arcuate cradle means disposed for supporting left and right wheels of an end of a vehicle which is to be towed; and means for separately power-articulating said upper, front and lower, rear hinge means respectively for raising and lowering said standard and for moving said cradles between a lowered position of use, in which said lower leg is approximately horizontal and projects rearwardly, and a stowed position, in which said lower leg is approximately vertical and projects upwardly from said lower site on said standard;

said upper, front transverse, horizontal-axis hinge member comprising a pipe hinge made of coaxial inner and outer steel pipes restrained against axial movement, the inner pipe thereof being secured to said frame members, and the outer pipe thereof having the front end of said upper leg secured thereof;

said upper leg comprising a pair of laterally spaced adjacent beams each separately secured to said outer pipe of said front transverse, horizontal-axis hinge member and to said standard;

said lower, rear transverse, horizontal-axis hinge member comprising a pipe hinge made of coaxial inner and outer steel pipes restrained against axial movement, one of the pipes thereof being secured to said standard and the other of the pipes thereof being secured to said lower leg.

2. The hoist of claim 1, wherein:

said standard comprises a first and second members which are adapted to rotate relative to one another about a generally vertical axis as a further hinge member, with said first member being secured to the upper leg and said second member being secured to the lower leg so as to permit at least limited articulation, in use, of an automobile being towed relative to the towing vehicle.

3. The hoist of claim 2, further comprising:

means engageable between said first and second members for selectively preventing relative rotation thereof.

4. The hoist of claim 1, further comprising:

chain means connectable between said lower leg and said standard, in the vicinity of said upper site, for fixing angular positioning of said lower, rear hinge independently of whether power is supplied to said means for power-articulating said lower, rear hinge.

5. The hoist of claim 1, further including:

a power-rotatable winch drum adapted to be mounted on said vehicle bed;

a cable having one end secured to said drum for winding about and unwinding from about said drum as said drum is reversingly rotated;

guide means provided on said framework and on said Z-shaped support structure for leading said cable from said drum to the vicinity of said cradle means; and hook means provided on said cable at an opposite end thereof from said one end.

6. The hoist of claim 1, wherein:

said cradle means comprise a pair of generally part-cylindrically-curved arcuate members having upper surfaces oriented to nestle lower central portions of respective automotive tire treads thereon as a vehicle is raised to be towed by power articulating said means for power articulating said upper, front hinge so as to elevate said cradle means from ground level.

7. The hoist of claim 6, wherein:

each of said curved arcuate members comprises a curved steel plate having a lower front edge than rear edge when said lower leg is substantially horizontal and said cradle means is elevated for lifting and towing a vehicle, so that when said cradle means is lowered for permitting a vehicle to be pushed or pulled to place a set of wheels of a vehicle on the cradle means said rear edges of said curved steel plates are substantially flush with ground level.

8. The hoist of claim 7, wherein:

said lower leg further includes means for shackling a set of wheels of a vehicle onto said cradle means for restraining relative movement between the cradle means and a lifted and towed vehicle during towing thereof.

9. The hoist of claim 7, wherein:

each curved steel plate is connected to a cross-bar of said lower leg by a further steel plate which underlies the respective curved steel plate and thereby provides, in use, at least one-half inch of steel under the tread of the respective tires of the vehicle being towed.

10. The hoist of claim 1, wherein:

said standard is a pipe hinge made of coaxial inner and outer steel pipes restrained against relative axial movement.

11. The hoist of claim 1, wherein:

said lower leg includes longitudinally extending intermediate members between said front end thereof and said cradle means, these intermediate members each comprising a plurality of telescopically-related parts provided with means for selectively fixing a degree of telescopic extension thereof.

12. The hoist of claim 1, further comprising:

a boom having a front end mounted to said framework by transverse, horizontal-axis hinge means so as to cantilever rearwardly therefrom over said Z-shaped support structure; and means for power-articulating said hinge means for said boom for raising and lowering a rear end thereof.

13. The hoist of claim 12, wherein:

said means for power-articulating said hinge means for said boom is constituted by a lugs and pin mounted double-acting hydraulic ram.

14. The hoist of claim 13, wherein: said hydraulic ram is mounted between said boom and said upper leg of said Z-shaped support structure.

15. The hoist of claim 13, wherein:

said boom comprises a plurality of telescopically-related parts provided with means for selectively fixing a degree of telescopic extension thereof.

16. The hoist of claim 13, further including:

a power-rotatable winch drum adapted to be mounted on said vehicle bed;

a cable having one end secured to said drum for winding about and unwinding from about said drum as said drum is reversingly rotated;

guide means provided on said framework and on said boom for leading said cable from said drum, along said boom to a trailing end of said boom, so as to hang downwards therefrom; and hook means provided on said cable at an opposite end thereof from said one end.

* * * * *